United States Patent [19]

Eguchi

[11] 4,221,178
[45] Sep. 9, 1980

[54] SEWING MACHINE WITH CAM SELECTING DEVICE

[75] Inventor: Yasukata Eguchi, Kunitachi, Japan

[73] Assignee: Janome Sewing Machine Co. Ltd., Tokyo, Japan

[21] Appl. No.: 924,204

[22] Filed: Jul. 12, 1978

[30] Foreign Application Priority Data

Jul. 19, 1977 [JP] Japan ................................ 52-85593

[51] Int. Cl.² ............................................. D05B 3/02
[52] U.S. Cl. ............................. 112/158 E; 112/158 A
[58] Field of Search ........... 112/158 E, 158 A, 158 R, 112/121.11; 307/116, 117

[56] References Cited

U.S. PATENT DOCUMENTS

| | | | |
|---|---|---|---|
| 4,055,129 | 10/1977 | Hunts et al. | 112/158 E |
| 4,066,029 | 1/1978 | Suchsland et al. | 112/158 E |
| 4,084,523 | 4/1978 | Kasuga | 112/158 A |

FOREIGN PATENT DOCUMENTS 2735428 2/1978 Fed. Rep. of Germany ....... 112/158 E

*Primary Examiner*—Peter P. Nerbun
*Attorney, Agent, or Firm*—Michael J. Striker

[57] ABSTRACT

A pack of stitch-pattern cams provides a plurality of selectable stitch patterns. A cam follower is shiftable along the length of the cam pack, to different selected ones of the pattern cams. The force used to shift the cam follower is manually applied, using a cam selector knob on the exterior of the sewing machine. The selector knob is responsive to the touch of the user's hand, providing a touch-responsive signal which causes an electromagnet to automatically move the cam follower from an engaged to a disengaged position, so that the user can manually shift the follower. When the user lets go of the selector knob, the disappearance of the touch-responsive signal deenergizes the electromagnet and the follower returns to engaged position. A time-delay action is provided, so that the cam follower not move to disengaged position in response to mere inadvertent touching of the selector knob by the user. Likewise, a time-delay action is provided such that the follower not move back to engaged position until the user's hand has been removed from the selector knob for a predetermined short interval, to provide for the case that the user, during the course of a manual change of cam-follower setting, briefly remove her hand from the knob for whatever reason.

3 Claims, 3 Drawing Figures

FIG_1
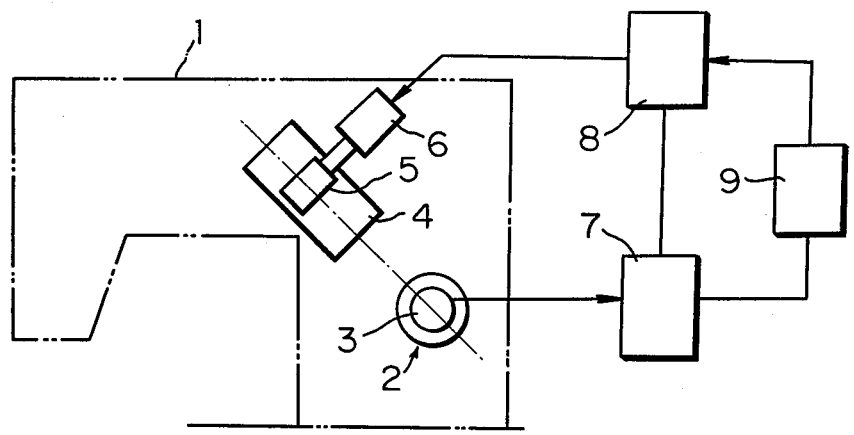
FIG_2
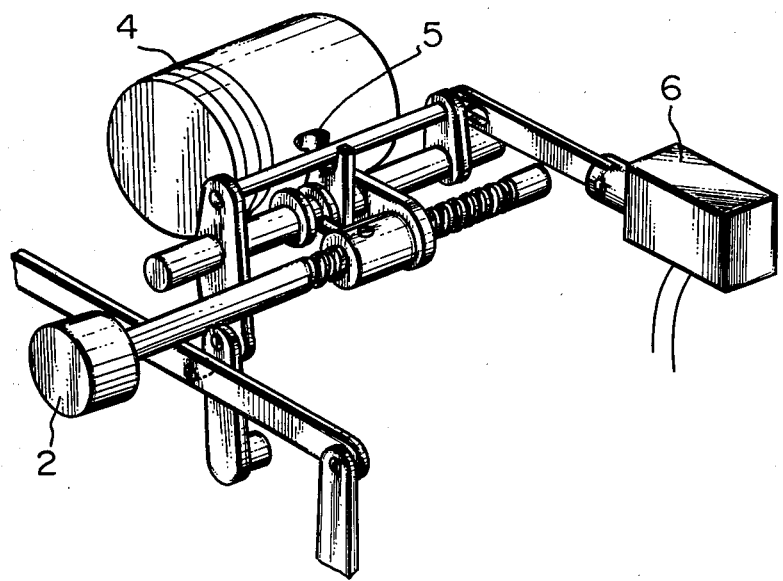

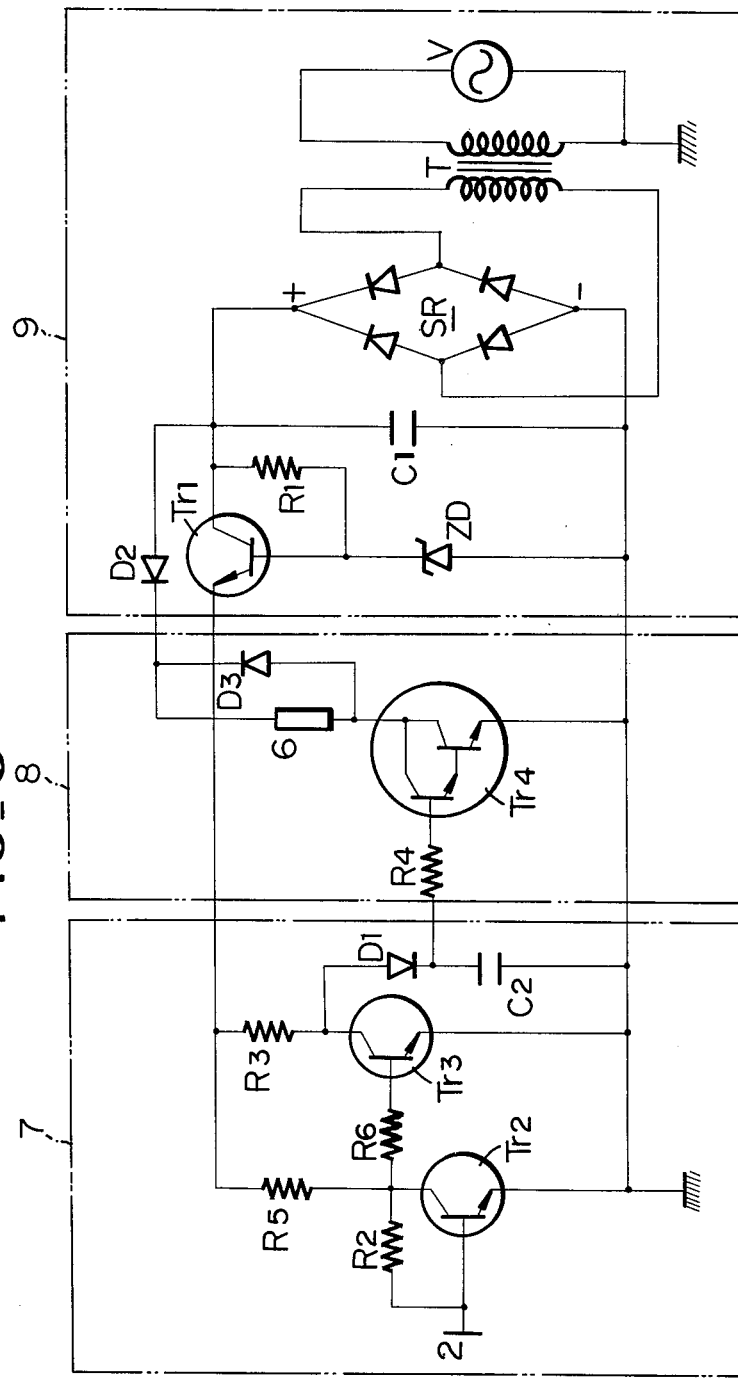
FIG._3

SEWING MACHINE WITH CAM SELECTING DEVICE

BRIEF DESCRIPTION OF THE INVENTION

The invention relates to sewing machines in general and more particularly relates to a sewing machine with a cam selecting device. It is known that the camn selecting device comprises a group of cams individually having different stitch patterns, and a cam follower arranged in opposite relation to the cam group. The cam follower is movable between a position in which the cam follower engages one of the cam group and a position in which the cam follower disengages from the cam. The cam follower is also shiftable along the cam group for selecting a desired one of the cam group. The cam follower is usually spring biased in the direction to engage one of the cam group. Therefore, in the prior art, it is necessary for the machine operator at the time of cam selection to firstly disengage the cam follower from one of the cam group and secondly shift the cam follower along the cam group to a desired one of the same. For this purpose, in the prior art, a first manually operated dial is provided to firstly disengage the cam follower from the corresponding cam and maintain the same in the disengaged position, and a second manually operated dial is provided to shift the cam follower along the cam group. Otherwise, a single manually operated dial is provided, which is firstly operated to disengage the cam follower the corresponding cam, and is secondly operated to shift the cam follower along the cam group while the cam follower is held in the disengaged position.

The present invention has been provided to eliminate the foregoing shortcomings and disadvantages of the prior art regarding the cam selecting operation. It is a fundamental object of this invention to provide a cam selecting device which is very simple in structure and very easily operable with a single manually operated dial. The dial is sensitive to a touch by a part of human body, e.g., by the operator's fingers, the produce an electric signal for actuating an electromagnetic solenoid through an appropriate electric circuit. The solenoid is actuated to disengage the cam follower from the corresponding cam, and is inactivated to allow the cam follower to engage one of the cam group when the operator's fingers are away from the dial. Therefore, in this invention the operator can select a desired cam by simply turning the dial without sustaining the spring biased force of the cam follower. It is another object of the invention to provide an electric control circuit partly operated to set a predetermined time to actuate the solenoid, and partly operated to set a predetermined time to inactivate the solenoid, all for the purpose of avoiding erroneous operations of the device.

BRIEF DESCRIPTION OF THE DRAWINGS

FIG. 1 is a block diagram of the invention,

FIG. 2 is an outlined representation of a mechanism of the invention, and

FIG. 3 is an electric control circuit for the mechanism according to the invention.

DETAIL DESCRIPTION OF THE INVENTION

FIG. 1 show a block diagram of the invention, in which the reference numeral 1 denotes a machine housing of a sewing machine. The numeral 2 is a pattern selecting dial with a manually operated knob 3 which is arranged on the front face of the machine housing as shown. The manually operated knob 3 is made of a conductive material, but is electrically insulated from the machine housing. The reference numeral 4 denotes a group of cams, and the numeral 5 denotes a cam follower which can be shifted along the group of cams to engage a desired one of the cams by manual operation of the dial 2. The swinging movement of the cam follower is transmitted to the needle bar through a transmission device, though these are not illustrated, in a known manner.

The reference numeral 6 denotes an electromagnetic solenoid which is optionally energized, at the time of cam selection, to release the cam follower 5 from the pattern cam with which the cam follower has been in engagement. The numeral 7 denotes a detecting element which detects a touch to the pattern selecting dial 2 by a part of a human body, and produces a signal. The signal from the detecting element is transmitted to an output circuit 8 which actuates the solenoid 6. The reference numeral 9 denotes a power source of this invention.

FIG. 2 is an outlined illustration of a mechanism of this invention. FIG. 4 shows in detail an electric circuit corresponding to a part of the block diagram in FIG. 1. (V) is an A.C. power source having one end thereof grounded. (T) is a transformer. (SR) is a full wave rectifier circuit. ($Tr_1$) is a transistor having the collector connected to the positive terminal of the rectifier circuit (SR). Resistor ($R_1$) is connected between the collector and the base of the transistor. The base of the transistor ($Tr_1$) is connected, through a zener diode (ZD), to the grounded negative terminal of the rectifier circuit. ($C_1$) is a capacitor for smoothing the voltage of the collector and the base of the transistor ($Tr_1$). The capacitor ($C_1$), the transistor ($Tr_1$) and the zener diode (ZD) constitute a constant-voltage circuit. ($Tr_2$) is another transistor having a collector connected to the emitter of the transistor ($Tr_1$). The collector is further connected, through a resistor ($R_2$), to the base of the same transistor ($Tr_2$), and the base is connected to the pattern selecting dial 2. The resistor ($R_2$) is used to bias the base voltage, and has a resistance so high that the transistor ($Tr_2$) is not made conductive in the normal condition. The emitter of the transistor ($Tr_2$) is connected to the negative terminal of the rectifier circuit (SR). The transistor ($Tr_2$) is so sensitive that the transistor becomes conductive with the stray potential due to the power sourse (V) which is applied to the base of the transistor ($Tr_2$) when a part of a human body touches the pattern selecting dial 2.

Transistor ($Tr_3$) has a base connected to the collector of the transistor ($Tr_2$), and a collector connected, through a resistor ($R_3$), to the emitter of the transistor ($Tr_1$). The collector and the emitter of the transistor ($Tr_3$) is connected to each other via a capacitor ($C_2$). The capacitor ($C_2$) is charged with a charging time constant determined by the resistor ($R_3$) and the capacitor ($C_2$) when the transistor ($Tr_3$) is inconductive, and produces a rectified output signal. ($Tr_4$) is a compound transistor with the Darlington connections. The transistor ($Tr_4$) has a signal input base for receiving a current from the capacitor ($C_2$) via a resistor ($R_4$) as illustrated. The transistor ($Tr_4$) receives the base current when the transistor ($Tr_3$) is inconductive. Immediately after the transistor ($Tr_3$) becomes conductive, the base current is supplied continuously for a predetermined time with a discharging time constant determined by the resistor ($R_4$) and the capacitor ($C_2$). Diode ($D_1$) is provided as shown to prevent the capacitor ($C_2$) from discharging through the transistor ($Tr_3$) while the capacitor ($C_2$) discharges through the resistor ($R_4$). ($R_5$) and ($R_6$) are limiting resistors. The transistor ($Tr_4$) has a load side connected to the solenoid 6 which receives the rectifier power source (SR) via a diode ($D_2$) as shown. ($D_3$) is a diode for protecting the solenoid 6 at the time of current blockage thereto.

In such an electric circuit of the elements as described in reference to FIG. 3, the transistor ($Tr_2$) is inconductive, but the transistor ($Tr_3$) is conductive, and therefore, the solenoid 6 is not operative. If the machine operator touches the pattern selecting dial 2 with fingers for pattern cam selection, the base of the transistor ($Tr_2$) receives a stray pontential from the power source (V), and the transistor ($Tr_2$) becomes conductive. As the consequence, the transistor ($Tr_3$) becomes inconductive to charge the capacitor ($C_2$). After a predetermined time, the transistor ($Tr_4$) becomes conductive to energize the solenoid 6 for operation. As the result, the solenoid 6 is operated to disengage the cam follower 5 in FIG. 2 from one of the pattern cams 4 which has been engaged by the cam follower. Thus the cam follower 5 can be shifted along the pattern cam by manually turning the pattern selecting dial (2). The predetermined time or duration, in which the solenoid is operated, has been provided to prevent the solenoid 6 from being operated by the operator's unconsious and instantenous touch to the pattern selecting dial 2. In this invention, the predetermined time is not longer than the time in which the machine operator normally touches the dial 2 with fingers and then starts to turn the dial.

If the machine operator lets go her hold of the dial 2 after she has turned the dial to shift the cam follower 5 to a desired one of pattern cams 4, the solenoid 6 is deenergized to be inoperative after a predetermined time, and the cam follower is engaged to the selected pattern cam. The predetermined time or duration is longer than the time in which the machine operator happens to carelessly and instanteneously let go her hold of the dial but instantly set to operate the dial again during the operation of the dial 2. Namely, in this invention, the solenoid 6 is not deenergized if the operator lets go her hold of the dial carelessly during the dial operation.

We claim:

1. A sewing machine with a group of cams each configured in accordance with a respective stitch pattern, in combination, a cam follower mounted to shift along the group of cams, the cam follower also being mounted for movement between an engaged position engaging one of the cams and a disengaged position not engaging any of the cams, manually powered means used by the operator for manually shifting the cam follower from one cam of the group of cams to another as desired, the manually powered means including a selector member moved by the user of the machine, the manually applied force exerted by the user to move the selector member effecting the shifting of the cam follower, the selector member being provided with touch-responsive means operative for generating a touch-responsive signal when the selector member is being touched by the user preliminary to and during manual movement of the selector member by the user, and means responding to the touch-responsive signal by moving the cam follower from the engaged to the disengaged position, whereby when the user touches the selector member preparatory to changing the setting of the selector member the cam follower is automatically disengaged before the user begins to perform manual shifting of the cam follower.

2. A sewing machine as defined in claim 1, the means responding to the touch-responsive signal by moving the cam follower to the disengaged position thereof including time-delay means delaying the response to the user's touch whereby if the hand of the user merely strays and briefly contacts the selector member instead of firmly holding the selector member this in itself does not effect movement of the cam follower to disengage position.

3. A sewing machine as defined in claim 1, the means responding to the touch-responsive signal by moving the cam follower to the disengaged position thereof including time-delay means delaying the response to removal of the user's touch, whereby the follower does not move back to engaged position in response to mere brief or inadvertent removal of the user's hand from the selector member during the course of a manual shifting of the follower but instead moves back to engaged position only after the user's hand has been removed from the selector member for a predetermined time interval.

* * * * *